US006682830B2

(12) United States Patent
Ogawa

(10) Patent No.: US 6,682,830 B2
(45) Date of Patent: Jan. 27, 2004

(54) RADIATION IMAGE STORAGE PANEL

(75) Inventor: Hiroshi Ogawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/861,571

(22) Filed: May 22, 2001

(65) Prior Publication Data

US 2002/0001735 A1 Jan. 3, 2002

(30) Foreign Application Priority Data

May 22, 2000 (JP) ....................................... 2000-150089

(51) Int. Cl.[7] ............................ B32B 27/00; G21K 4/00

(52) U.S. Cl. ....................... 428/690; 428/421; 428/447; 250/484.3; 250/484.4; 528/33; 528/38

(58) Field of Search ................................ 428/690, 691, 428/447, 421; 250/484.4, 484.3; 528/33, 38

(56) References Cited

U.S. PATENT DOCUMENTS

| | | | | | |
|---|---|---|---|---|---|
| 4,239,968 | A | | 12/1980 | Kotera et al. | 250/327.1 |
| 5,227,253 | A | * | 7/1993 | Takasu et al. | 428/690 |
| 5,397,764 | A | * | 3/1995 | Yokoyama et al. | 503/227 |
| 5,519,228 | A | * | 5/1996 | Takasu et al. | 250/484.4 |
| 5,641,968 | A | * | 6/1997 | Suzuki et al. | 250/484.4 |
| 5,866,266 | A | * | 2/1999 | Takasu | 428/690 |
| 5,880,476 | A | * | 3/1999 | Suzuki | 250/484.4 |
| 5,925,473 | A | * | 7/1999 | Kuriyama et al. | 428/690 |
| 6,027,810 | A | * | 2/2000 | Dahlquist et al. | 428/409 |
| 6,075,250 | A | * | 6/2000 | Fukui et al. | 250/484.4 |
| 6,171,770 | B1 | * | 1/2001 | Chen et al. | 430/531 |
| 6,221,516 | B1 | * | 4/2001 | Koheda et al. | 428/690 |
| 6,246,063 | B1 | * | 6/2001 | Fukui | 250/484.4 |

FOREIGN PATENT DOCUMENTS

| | | | |
|---|---|---|---|
| JP | 2715189 | 11/1997 | G21K/4/00 |

* cited by examiner

*Primary Examiner*—Marie Yamnitzky
*Assistant Examiner*—Camie S Thompson
(74) *Attorney, Agent, or Firm*—Sughrue Mion, PLLC

(57) ABSTRACT

A radiation image storage panel comprises at least a phosphor layer and a protective film. The protective film contains a film-forming resin, a reactive silicone, which has at least one hydroxyl group or at least one amino group at a terminal and has a number-average molecular weight falling within the range of 5,000 to 30,000, and a crosslinking agent capable of undergoing reaction with the hydroxyl group or the amino group of the reactive silicone. The reactive silicone has been crosslinked by the crosslinking agent. The film-forming resin may contain a fluorine type of resin, which is soluble in an organic solvent.

7 Claims, No Drawings

RADIATION IMAGE STORAGE PANEL

BACKGROUND OF THE INVENTION

1. Field of the Invention

This invention relates to a radiation image storage panel for use in radiation image recording and reproducing techniques, in which phosphors are utilized. This invention also relates to a process for producing the radiation image storage panel.

2. Description of the Related Art

As techniques for obtaining radiation images for medical diagnosis and radiation images of various objects in a non-destructive mode and utilizing the radiation images for making medical diagnosis, flaw detecting inspections, and a like, radiography utilizing a combination of a silver halide photographic material (hereinbelow referred to simply as the photographic material) and an intensifying screen has heretofore been used in practice. With the radiography, radiation carrying image information of an object is irradiated to the intensifying screen, and a phosphor contained in the intensifying screen is excited by the radiation to emit near ultraviolet light or visible light. The emitted light impinges upon the photographic material, and a radiation image of the object is recorded on the photographic material. The radiation image is utilized for making medical diagnosis, flaw detecting inspections, or the like. Specifically, the photographic material comprises a substrate and a silver halide emulsion layer, which is overlaid on one surface of the substrate, or silver halide emulsion layers, which are overlaid on opposite surfaces of the substrate. Also, an intensifying screen is brought into close contact with one surface of the photographic material, or intensifying screens are brought into close contact with opposite surfaces of the photographic material. The combination of the photographic material and at least one intensifying screen is exposed to radiation carrying image information of the object, and the radiation image is thereby formed.

In lieu of the conventional radiography described above, radiation image recording and reproducing techniques utilizing stimulable phosphors have heretofore been used in practice. The stimulable phosphors have the properties such that, when the stimulable phosphors having absorbed energy from radiation are exposed to an electromagnetic wave, such as visible light or infrared rays, the stimulable phosphors are stimulated to emit the energy as fluorescence. The radiation image recording and reproducing techniques are described in, for example, U.S. Pat. No. 4,239,968. The radiation image recording and reproducing techniques utilize a radiation image storage panel (referred to also as the stimulable phosphor sheet) provided with a stimulable phosphor. With the radiation image recording and reproducing techniques, the stimulable phosphor of the radiation image storage panel is caused to absorb radiation, which carries image information of an object or which has been radiated out from a sample, and thereafter the stimulable phosphor is exposed to an electromagnetic wave (stimulating rays), such as visible light or infrared rays, which causes the stimulable phosphor to produce the fluorescence (i.e., to emit light) in proportion to the amount of energy stored thereon during its exposure to the radiation. The produced fluorescence (the emitted light) is photoelectrically detected to obtain an electric signal. The electric signal is then processed, and the processed electric signal is utilized for reproducing a visible image of the object or the sample.

The radiation image recording and reproducing techniques have the advantages in that a radiation image containing a large amount of information can be obtained with a markedly lower dose of radiation than in the conventional radiography utilizing the radiation film and the intensifying screen. Therefore, the radiation image recording and reproducing techniques are efficient particularly for direct medical radiography, such as the X-ray image recording for medical diagnosis.

Basically, the radiation image storage panel utilized for the radiation image recording and reproducing techniques comprises a substrate and a stimulable phosphor layer overlaid on the surface of the substrate. In cases where the stimulable phosphor layer has self-supporting properties, the radiation image storage panel need not necessarily be provided with the substrate. Ordinarily, a protective film is formed on the surface of the stimulable phosphor layer, which surface is opposite to the surface that stands facing the substrate. The protective film protects the stimulable phosphor layer from chemical deterioration or physical shocks.

By way of example, the protective film may be formed by applying a solution, which contains a transparent, organic high-molecular weight material, such as a cellulose derivative or a polymethyl methacrylate, in an appropriate solvent, onto the phosphor layer. Alternatively, the protective film may be formed by preparing a sheet for the formation of the protective film, such as an organic polymer film constituted of, e.g., a polyethylene terephthalate, or a transparent glass plate, and adhering the sheet for the formation of the protective film to the surface of the phosphor layer by use of an appropriate adhesive agent. As another alternative, the protective film may be formed by forming a film of an inorganic compound on the phosphor layer with a vacuum evaporation process. Of the above-enumerated protective films, the protective film formed by applying the solution, which contains the transparent, organic high-molecular weight material in the appropriate solvent, onto the phosphor layer, has the advantages in that the strength of adhesion with the phosphor layer is ordinarily high, and the protective film is capable of being produced with a comparatively simple process.

With the radiation image recording and reproducing techniques, the radiation image storage panel is utilized repeatedly through an operation cycle comprising the step of the irradiation of the radiation to the radiation image storage panel (the recording of the radiation image on the radiation image storage panel), the step of the irradiation of the stimulating rays to the radiation image storage panel (the readout of the recorded radiation image from the radiation image storage panel), and the step of the irradiation of erasing light to the radiation image storage panel (erasing of energy remaining on the radiation image storage panel). Also, conveyance of the radiation image storage panel to each of the steps is performed with conveyance means, such as belts and rollers. Ordinarily, after one operation cycle is finished, the radiation image storage panel is laid upon a radiation image storage panel, which has previously been subjected to the operation cycle. However, in cases where the radiation image storage panel provided with the protective film, which has been formed by applying the solution, which contains the transparent, organic high-molecular weight material in the appropriate solvent, onto the phosphor layer, is utilized repeatedly in this manner, for example, stains cling to the surface of the protective film, or scratches occur on the surface of the protective film. Therefore, there is the tendency for the image quality of the radiation image formed by the radiation image storage panel to become bad little by little.

As a radiation image storage panel provided with a protective film, which is capable of preventing the sensitivity of the radiation image storage panel from becoming low due to repeated use of the radiation image storage panel, the applicant proposed a radiation image storage panel provided with a protective film, which is formed from a film-forming resin and a polysiloxane skeleton-containing oligomer or a perfluoro alkyl group-containing oligomer. The radiation image storage panel is disclosed in Japanese Patent No. 2715189.

The protective film of the radiation image storage panel disclosed in Japanese Patent No. 2715189 has sufficient effects with respect to repeated use of at most 1,000 times. However, recently, several thousands of times to more than 10,000 times of repeated use is required of the radiation image storage panels. Therefore, there is a strong demand for a protective film having a durability enhanced even further.

However, with the protective film, which merely contains the polysiloxane skeleton-containing oligomer or the perfluoro alkyl group-containing oligomer and which contains no molecular bond in the film, when the surface of the protective film is repeatedly brought into contact with surfaces of other objects, the oligomer is apt to separate from the protective film. Therefore, with the protective film, which merely contains the polysiloxane skeleton-containing oligomer or the perfluoro alkyl group-containing oligomer and which contains no molecular bond in the film, durability against sliding operations during several thousands of times to more than 10,000 times of repeated use.

SUMMARY OF THE INVENTION

The primary object of the present invention is to provide a radiation image storage panel, which has excellent durability against conveying operations, excellent anti-staining properties, and excellent anti-scratching properties and is capable of coping with an increases number of times of repeated use recently required of radiation image storage panels.

The present invention provides a radiation image storage panel, comprising at least a phosphor layer and a protective film, wherein the protective film contains a film-forming resin, a reactive silicone, which has at least one hydroxyl group or at least one amino group at a terminal and has a number-average molecular weight falling within the range of 5,000 to 30,000, and a crosslinking agent capable of undergoing reaction with the hydroxyl group or the amino group of the reactive silicone, and wherein the reactive silicone has been crosslinked by the crosslinking agent.

The term "radiation image storage panel" as used herein means both the radiation image storage panel containing a stimulable phosphor, which radiation image storage panel is employed for radiation image recording and reproducing techniques utilizing a stimulable phosphor, and the intensifying screen utilized for the conventional radiography.

In the radiation image storage panel in accordance with the present invention, the film-forming resin should preferably contain a fluorine type of resin, which is soluble in an organic solvent.

The number-average molecular weight (Mn) of the reactive silicone is the value represented by the formula, $Mn=\Sigma N_i M_i/\Sigma N_i$, wherein $M_i$ represents the molecular weight of an i-th molecular weight range, and $N_i$ represents the number of molecules in the i-th molecular weight range. Specifically, the number-average molecular weight of the reactive silicone is the value as measured with a technique, such as an osmometry or a terminal analysis. In the radiation image storage panel in accordance with the present invention, the number-average molecular weight of the reactive silicone falls within the range of 5,000 to 30,000, and should preferably fall within the range of 10,000 to 20,000.

Also, in the radiation image storage panel in accordance with the present invention, the reactive silicone has at least one hydroxyl group or at least one amino group at a terminal. The reactive silicone should preferably have at least one hydroxyl group or at least one amino group at each of two terminals. Alternatively, the reactive silicone should preferably have at least two hydroxyl groups or at least two amino groups at one terminal.

Further, in the radiation image storage panel in accordance with the present invention, the reactive silicone should preferably be contained in a proportion falling within the range of 0.1% by weight to 20% by weight with respect to the film-forming resin. The reactive silicone should more preferably be contained in a proportion falling within the range of 0.5% by weight to 10% by weight with respect to the film-forming resin.

Furthermore, in the radiation image storage panel in accordance with the present invention, the crosslinking agent should preferably be contained in a proportion of at least as many equivalents as total equivalents of the film-forming resin and the reactive silicone.

In the radiation image storage panel in accordance with the present invention, the reactive silicone has been crosslinked by the crosslinking agent. Specifically, all of the reactive silicone contained in the protective film may be crosslinked by the crosslinking agent. Alternatively, an unreacted portion of the reactive silicone and the crosslinking agent may be contained in the protective film. More specifically, the reactive silicone having been crosslinked by the crosslinking agent, the unreacted reactive silicone having not been crosslinked by the crosslinking agent, and the crosslinking agent, which has not crosslinked the reactive silicone, may be contained in the protective film.

Also, in the radiation image storage panel in accordance with the present invention, the crosslinking agent should preferably be selected from the group consisting of a polyisocyanate and an amino resin. The polyisocyanate should preferably be a non-yellowing polyisocyanate.

With the radiation image storage panel in accordance with the present invention, the protective film contains the film-forming resin, the reactive silicone, which has at least one hydroxyl group or at least one amino group at a terminal and has a number-average molecular weight falling within the range of 5,000 to 30,000, and the crosslinking agent capable of undergoing reaction with the hydroxyl group or the amino group of the reactive silicone. Also, the reactive silicone has been crosslinked by the crosslinking agent, and the reactive silicone and the crosslinking agent form molecular bonds in the protective film. Therefore, the reactive silicone constituting the protective film does not readily separate from the protective film. Accordingly, the radiation image storage panel in accordance with the present invention has excellent durability against sliding operations and excellent anti-scratching properties and is capable of coping with several thousands of times to more than 10,000 times of repeated use recently required of radiation image storage panels.

Also, with the radiation image storage panel in accordance with the present invention, wherein the reactive silicone has a number-average molecular weight falling within the range of 5,000 to 30,000, even if the surface of the radiation image storage panel is subjected to cleaning with an alcohol, such as ethyl alcohol, for removal of stains, the reactive silicone will not readily separate from the protective film. Therefore, the radiation image storage panel in accordance with the present invention has excellent anti-staining properties and a sufficiently high durability.

Specifically, in Japanese Patent No. 2715189, it is described that the weight-average molecular weight (Mw) should preferably fall within the range of 3,000 to 10,000. The weight-average molecular weight (Mw) falling within the range of 3,000 to 10,000 may be converted into the number-average molecular weight (Mn) falling within the range of 1,000 to less than 5,000. (The conversion is made by utilizing an ordinary ratio of Mw to Mn between 2:1 and 3:1.) However, if the number-average molecular weight falls within the range of 1,000 to less than 5,000, the molecular weight is low, and the reactive silicone will be readily removed with an alcohol during the cleaning process. Also, in cases where the hydroxyl group or the amino group for the formation of the molecular bond is contained in the protective film, if the number-average molecular weight of the reactive silicone is less than 5,000, compatibility of the reactive silicone with the film-forming resin will become high, and it will become difficult for the reactive silicone to be arranged on the surface of the coating film. Also, in such cases, the compatibility of the reactive silicone with stain constituents will become good, and sufficient anti-staining properties cannot be obtained. If the number-average molecular weight of the reactive silicone is more than 30,000, the compatibility of the reactive silicone with the film-forming resin or the crosslinking agent will become bad. Also, in such cases, the proportion of the hydroxyl group or the amino group in the reactive silicone will become low, and the reactivity of the reactive silicone will become low. As a result, the reactive silicone will become apt to separate from the protective film, and a sufficient durability against sliding operations and sufficient anti-scratching properties cannot be obtained.

With the radiation image storage panel in accordance with the present invention, wherein the number-average molecular weight of the reactive silicone falls within the range of 10,000 to 20,000, the durability against conveying operations, the anti-staining properties, and the anti-scratching properties are capable of being enhanced even further.

With the radiation image storage panel in accordance with the present invention, wherein the reactive silicone is contained in a proportion falling within the range of 0.1% by weight to 20% by weight with respect to the film-forming resin, the molecular bonds in the protective film are capable of being formed densely, and therefore the durability against conveying operations is capable of being enhanced even further.

With the radiation image storage panel in accordance with the present invention, wherein the crosslinking agent is contained in a proportion of at least as many equivalents as total equivalents of the film-forming resin and the reactive silicone, the molecular bonds in the protective film are capable of being formed densely, and therefore the durability against conveying operations is capable of being enhanced even further.

DETAILED DESCRIPTION OF THE INVENTION

The protective film of the radiation image storage panel in accordance with the present invention contains the film-forming resin, the reactive silicone, which has at least one hydroxyl group or at least one amino group at a terminal and has a number-average molecular weight falling within the range of 5,000 to 30,000, and the crosslinking agent capable of undergoing reaction with the hydroxyl group or the amino group of the reactive silicone, the reactive silicone having been crosslinked by the crosslinking agent.

As the film-forming resin utilized for the formation of the protective film, one of various resins known for the formation of protective films may be employed. Examples of preferable film-forming resins include a polyurethane resin, a polyacrylic resin, a cellulose derivative, a polymethyl methacrylate, a polyester resin, and an epoxy resin. In particular, the film-forming resin should preferably be a fluorine type of resin soluble in an organic solvent.

The fluorine type of resin may be a polymer of a fluorine-containing olefin (i.e., a fluoro olefin) or a copolymer, which contains a fluorine-containing olefin as a copolymer constituent. Examples of preferable fluorine types of resins include a polytetrafluoroethylene, a polychlorotrifluoroethylene, a polyvinyl fluoride, polyvinylidene fluoride, a tetrafluoroethylene-hexafluoropropylene copolymer, and a fluoro olefin-vinyl ether copolymer.

Ordinarily, the fluorine types of resins are insoluble in organic solvents. However, the copolymer, which contains the fluoro olefin as a copolymer constituent, is capable of being formed as an organic solvent-soluble copolymer, depending upon the other constitution unit (other than the fluoro olefin) participating in the copolymerization. Therefore, the protective film is capable of being formed easily by dissolving the fluorine type of resin in an appropriate solvent to prepare a solution, applying the solution onto the phosphor layer, and drying the applied solution. An example of the preferable the copolymer, which contains the fluoro olefin as a copolymer constituent, is the fluoro olefin-vinyl ether copolymer. Also, the polytetrafluoroethylene and its modification product are soluble in an appropriate fluorine type of organic solvent, such as a perfluoro solvent. Therefore, as in the cases of the copolymer, which contains the fluoro olefin as a copolymer constituent, the polytetrafluoroethylene or its modification product is capable of being utilized for forming the protective film with the coating process.

In cases where the fluorine type of resin is employed as the film-forming resin, the fluorine type of resin should preferably be crosslinked. In such cases, the strength of the fluorine type of resin is capable of being enhanced, and the durability of the protective film is capable of being enhanced due to the reaction of the reactive silicone and the crosslinking agent with each other. As the fluorine type of resin, a radiation-curing, fluorine type of resin may also be employed. The radiation-curing, fluorine type of resin may be crosslinked by the irradiation of radiation.

The content of the fluorine type of resin in the protective film should preferably be at least 30% by weight with respect to the entire protective film, should more preferably be at least 50% by weight with respect to the entire protective film, should most preferably be approximately 70% by weight with respect to the entire protective film.

Specific examples of preferable fluorine types of resins soluble in organic solvents include Opster JN7212, JN7205, and JN7220 (supplied by JSR K. K.); Zeffle LC-930 and GK510 (supplied by Daikin Industries, Ltd.); Dionin THV220 (supplied by Sumitomo 3M Ltd.); and Lumiflon LF100, LF200, LF216T, LF400, LF504, LF600, LF810, LF916, LF924, LF946, LF976, and LF9010 (supplied by Asahi Glass Co., Ltd.).

The reactive silicone (silicone macro-monomer) contained in the protective film has, for example, a dimethyl polysiloxane skeleton. The reactive silicone has at least one hydroxyl group or at least one amino group at a terminal and has a number-average molecular weight falling within the range of 5,000 to 30,000. The reactive silicone should preferably have a number-average molecular weight falling within the range of 10,000 to 20,000.

As described above, the reactive silicone has at least one hydroxyl group or at least one amino group at a terminal. The reactive silicone should preferably have at least one hydroxyl group or at least one amino group at each of the two terminals. Alternatively, the reactive silicone should preferably have at least two hydroxyl groups or at least two amino groups at one terminal. In cases where the reactive silicone has at least one hydroxyl group or at least one amino group at each of the two terminals, the reactivity with the crosslinking agent and the compatibility with the film-forming resin are capable of being enhanced, and a sufficient durability is capable of being obtained. In cases where the reactive silicone has at least two hydroxyl groups or at least two amino groups atone terminal, the orientation to the surface of the protective film is capable of being enhanced, and sufficient anti-staining properties are capable of being obtained. Therefore, the reactive silicone should more preferably have at least two hydroxyl groups or at least two amino groups at one terminal. The reactive silicone should most preferably have at least two hydroxyl groups at one terminal.

Further, the reactive silicone may contain a perfluoro alkyl group. Specific examples of the reactive silicones, which are capable of being employed in the radiation image storage panel in accordance with the present invention, will be listed below. The reactive silicones (silicone macro-monomers) listed below are commercially available under the trade name of Silaplane Series (supplied by Chisso Corp.). In the chemical formulas shown below, n represents a number such that Mn falls within the range of 5,000 to 20,000.

FM-04 Series:

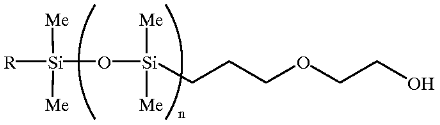

FM-0421 (Mn = 5,000), FM-0425 (Mn = 10,000)

FM-44 Series:

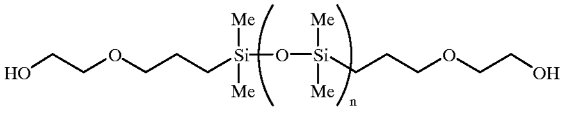

FM-0421 (Mn = 5,000), FM-4425 (Mn = 10,000)

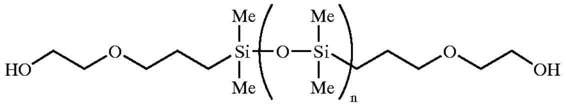

FM-4421 (Mn = 5,000), FM-4425 (Mn = 10,000)

FM-33 Series:

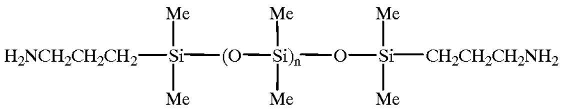

FM-3321 (Mn = 5,000), FM-3325 (Mn = 10,000)

FM-DA Series:

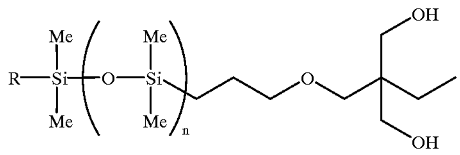

FM-DA21 (Mn = 5,000), FM-DA25 (Mn = 10,000), FM-DA26 (Mn = 15,000)

In cases where the radiation-crosslinking, fluorine type of resin is employed, a reactive silicone having at least one methacryloxy group at one terminal or at each of the two terminals, such as FM-0721 or FM-0725, should preferably be employed.

FM-07 Series:

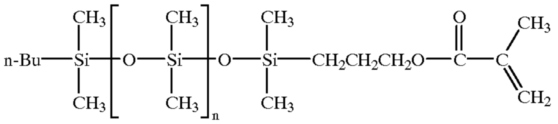

FM-0721 (Mn = 5,000), FM-0725 (Mn = 10,000)

The reactive silicone should preferably be contained in a proportion falling within the range of 0.1% by weight to 20% by weight with respect to the film-forming resin in the protective film. The reactive silicone should more preferably be contained in a proportion falling within the range of 0.5% by weight to 10% by weight with respect to the film-forming resin in the protective film. Also, in order for the reactivity of the reactive silicone to be enhanced, an organometallic catalyst or an amine type of catalyst may be added as a catalyst to the protective film. In particular, the organometallic catalyst has reactivity with the crosslinking agent and an appropriate level of compatibility with the crosslinking agent and the film-forming resin and is therefore preferable. Examples of preferable organometallic catalysts include dibutyltin diacetate, dibutyltin dilaurate, and dibutyltin dimaleate. Examples of preferable amine types of catalysts include triethylamine, N,N-dimethylcyclohexylamine, triethylenediamine, and dimethylaminoethanol.

As the crosslinking agent utilized in the protective film of the radiation image storage panel in accordance with the present invention, a polyisocyanate or an amino resin should preferably be employed. As the polyisocyanate, a non-yellowing polyisocyanate, which is free from yellowing with the passage of time.

Examples of the non-yellowing polyisocyanates include Coronate HL and Coronate HX (supplied by Nippon Polyurethane K. K.); and Sumidur N75, N3200, HT, and Desmodur N3300, Z4470, E3265, E4280 (supplied by Sumitomo Bayer Urethane K. K.).

Examples of preferable amino resins include melamines, such as a complete alkyl type methylated melamine, a methylol group type methylated melamine, and imino group type methylated melamine, e.g., hexamethoxymelamine, methoxymethylolmelamine, and methoxybutylmelamine; and benzoguanamine. Examples of preferable hexamethoxymelamine include Cymel 300, 301, 303, and 350 (supplied by Mitsui Cytec Ltd.).

If the amount of the crosslinking agent added is smaller than the total equivalents of the film-forming resin and the reactive silicone, the reactivity with the reactive silicone will become insufficient, the reactive silicone will be apt to separate from the protective film during sliding operations of the radiation image storage panel, and a sufficient durability cannot be obtained. Therefore, the crosslinking agent should preferably be contained in a proportion of at least as many equivalents as the total equivalents of the film-forming resin and the reactive silicone.

The protective film may further contain organic or inorganic white fine particles. The mean particle diameter of the fine particles should preferably fall within the range of 0.1 $\mu$m to 5 $\mu$m, and should more preferably fall within the range of 0.3 $\mu$m to 1 $\mu$m. The fine particles should preferably be contained in a proportion falling within the range of 5% by weight to 120% by weight with respect to the weight of the film-forming resin in the protective film. In the cases of the organic fine particles, the organic fine particles should preferably be contained in a proportion falling within the range of 5% by weight to 40% by weight with respect to the weight of the film-forming resin in the protective film. In the cases of the inorganic fine particles, the inorganic fine particles should preferably be contained in a proportion falling within the range of 10% by weight to 100% by weight with respect to the weight of the film-forming resin in the protective film.

As the white organic fine particles, fine particles of a benzoguanamine resin, a melamine-formaldehyde resin, a cured acrylic resin, a silicone resin, a fluorine type of resin, a polyester resin, or the like, should preferably be employed. Examples of the white organic fine particles include Eposter Series MS, M30, S, S6, S12, and Eposter MA Series (supplied by Nippon Shokubai Kagaku Kogyo Co., Ltd.); MR-2G, MR-7G, and MP Series (supplied by Soken Kagaku K. K.); Lublon L-2, L-5, LD-1, and LD-100 (supplied by Daikin Industries, Ltd.); Tospearl XC99-A8808, Tospearl 120, 130, 145, and 240 (supplied by GE Toshiba Silicone Co.); and Petbeads Series (supplied by Toyobo Co., Ltd.).

As the white inorganic fine particles, alumina, silica, calcium carbonate, magnesium oxide, zinc oxide, lead oxide, tin oxide, gadolinium oxide, mica, zeolite, barium sulfate, diamond, or the like, should preferably be employed. Examples of the white inorganic fine particles include AKP10, AKP20, AKP30, HIT50, HIT100, and Sumicorundum Series, such as Sumicorundum AA1 (supplied by Sumitomo Chemical Co., Ltd.); KEP Series, such as KEP150 (supplied by Nippon Shokubai Kagaku Kogyo Co., Ltd.); Pastrn Series (supplied by Mitsui Mining and Smelting Co., Ltd.); and Hakuenka Series and Homocal Series (supplied by Shiraishi Calcium Co., Ltd.).

Besides the film-forming resin, the reactive silicone, and the crosslinking agent, the protective film of the radiation image storage panel in accordance with the present invention may also contain an anti-yellowing agent, and the like.

The protective film of the radiation image storage panel in accordance with the present invention may be formed by mixing the film-forming resin, the reactive silicone, and the crosslinking agent together to form a coating composition for the formation of the protective film, applying the coating composition for the formation of the protective film onto a surface of a transparent substrate, such as a polyethylene terephthalate (PET) film, by the utilization of coating means, such as a doctor blade coater, a dip coater, a slide coater, or an extrusion coater, drying and hardening the applied coating composition to form the protective film, overlaying an adhesive agent layer on the surface of the PET film, which surface is opposite to the surface having been provided with the protective film, and laminating the protective film with the surface of the phosphor layer via the adhesive layer. Alternatively, the protective film may be formed by directly applying the coating composition for the formation of the protective film onto the surface of the phosphor layer, and drying and hardening the applied coating composition. The protective film may be formed simultaneously with the formation of the phosphor layer with a simultaneous wet-on-wet coating technique.

Phosphors capable of being employed in the radiation image storage panel in accordance with the present invention will be described hereinbelow.

As the phosphor, a stimulable phosphor may be employed. The stimulable phosphor has the properties such that, when the stimulable phosphor is caused to absorb radiation and is then exposed to stimulating rays, the stimulable phosphor emits light in proportion to the amount of energy stored thereon during its exposure to the radiation. From the practical aspect, the stimulable phosphor should preferably have the characteristics such that, when the stimulable phosphor is exposed to the stimulating rays having wavelengths falling within the range of 400 nm to 900 nm, the stimulable phosphor emits light having wavelengths falling within the range of 300 nm to 500 nm.

Examples of the stimulable phosphors, which may be employed in the radiation image storage panel in accordance with the present invention, include the following:

a phosphor represented by the formula SrS:Ce, Sm; SrS:Eu, Sm; $ThO_2$:Er; or $La_2O_2S$:Eu, Sm, as described in U.S. Pat. No. 3,859,527, a phosphor represented by the formula ZnS:Cu, Pb; BaO'x$Al_2O_3$:Eu wherein $0.8 \leqq x \leqq 10$; $M^{II}$O'x$SiO_2$:A wherein $M^{II}$ is Mg, Ca, Sr, Zn, Cd, or Ba, A is Ce, Tb, Eu, Tm, Pb, Tl, Bi, or Mn, and x is a number satisfying $0.5 \leqq x \leqq 2.5$; or LnOX:xA wherein Ln is at least one of La, Y, Gd, and Lu, X is at least one of Cl and Br, A is at least one of Ce and Tb, x is a number satisfying $0<x<0.1$, as disclosed in U.S. Pat. No. 4,236,078, a phosphor represented by the formula $(Ba_{1-x-y}, Mg_x, Ca_y)FX:aEu^{2+}$ wherein X is at least one of Cl and Br, x and y are numbers satisfying $0<x+y \leqq 0.6$ and $xy \neq 0$, and a is a number satisfying $10^{-6} \leqq a \leqq 5 \times 10^{-2}$, as disclosed in DE-OS No. 2,928,245, a phosphor represented by the formula $(Ba_{1-x}, M^{2+})FX:yA$ wherein $M^{2+}$ is at least one of Mg, Ca, Sr, Zn, and Cd, X is at least one of Cl, Br, and I, A is at least one of Eu, Tb, Ce, Tm, Dy, Pr, Ho, Nd, Yb, and Er, x is a number satisfying $0 \leqq x \leqq 0.6$, and y is a number satisfying $0 \leqq y \leqq 0.2$, as disclosed in U.S. Pat. No. 4,239,968, a phosphor represented by the formula $M^{II}$FX'xA:yLn wherein $M^{II}$ is at least one of Ba, Ca, Sr, Mg, Zn, and Cd, A is at least one of BeO, MgO, CaO, SrO, BaO, ZnO, $Al_2O_3$, $Y_2O_3$, $La_2O_3$, $In_2O_3$, $SiO_2$, $TiO_2$, $ZrO_2$, GeO2, $SnO_2$, $Nb_2O_5$, $Ta_2O_5$, and $ThO_2$, Ln is at least one of Eu, Tb, Ce, Tm, Dy, Pr, Ho, Nd, Yb, Er, Sm, and Gd, X is at least one of Cl, Br, and I, x is a number satisfying $5 \times 10^{-5} \leqq x \leqq 0.5$, and y is a number satisfying $0<y \leqq 0.2$, as described in Japanese Unexamined Patent Publication No. 55(1980)-160078, a phosphor represented by the formula $(Ba_{1-x}, M^{II}{}_x)F_2{}'aBaX_2{:}yEu, zA$ wherein $M^{II}$ is at least one of beryllium, magnesium, calcium, strontium, zinc, and cadmium, X is at least one of chlorine, bromine, and iodine, A is at least one of zirconium and scandium, a is a number satisfying $0.5 \leq a \leq 1.25$, x is a number satisfying $0 \leq x \leq 1$, y is a number satisfying $10^{-6} \leq y \leq 2\times10^{-1}$, and z is a number satisfying $0<z \leq 10^{-2}$, as described in Japanese Unexamined Patent Publication No. 56(1981)-116777, a phosphor represented by the formula $(Ba_{1-x}, M^{II}{}_x)F_2{}'aBaX_2{:}yEu, zB$ wherein $M^{II}$ is at least one of beryllium, magnesium, calcium, strontium, zinc, and cadmium, X is at least one of chlorine, bromine, and iodine, a is a number satisfying $0.5 \leq a \leq 1.25$, x is a number satisfying $0 \leq x \leq 1$, y is a number satisfying $10^{-6} \leq y \leq 2\times10^{-1}$, and z is a number satisfying $0<z \leq 10^{-2}$, as described in Japanese Unexamined Patent Publication No. 57(1982)-23673, a phosphor represented by the formula $(Ba_{1-x}, M^{II}{}_x)F_2{}'aBaX_2{:}yEu, zA$ wherein $M^{II}$ is at least one of beryllium, magnesium, calcium, strontium, zinc, and cadmium, X is at least one of chlorine, bromine, and iodine, A is at least one of arsenic and silicon, a is a number satisfying $0.5 \leq a \leq 1.25$, x is a number satisfying $0 \leq x \leq 1$, y is a number satisfying $10^{-6} \leq y \leq 2\times10^{-1}$, and z is a number satisfying $0<z \leq 5\times10^{-1}$, as described in Japanese Unexamined Patent Publication No. 57(1982)-23675, a phosphor represented by the formula $M^{III}OX{:}xCe$ wherein $M^{III}$ is at least one trivalent metal selected from the group consisting of Pr, Nd, Pm, Sm, Eu, Tb, Dy, Ho, Er, Tm, Yb, and Bi, X is either one or both of Cl and Br, and x is a number satisfying $0<x<0.1$, as described in Japanese Unexamined Patent Publication No. 58(1983)-69281, a phosphor represented by the formula $Ba_{1-x}M_{x/2}L_{x/2}FX{:}yEu^{2+}$ wherein M is at least one alkaline metal selected from the group consisting of Li, Na, K, Rb, and Cs, L is at least one trivalent metal selected from the group consisting of Sc, Y, La, Ce, Pr, Nd, Pm, Sm, Gd, Tb, Dy, Ho, Er, Tm, Yb, Lu, Al, Ga, In, and Tl, X is at least one halogen selected from the group consisting of Cl, Br, and I, x is a number satisfying $10^{-2} \leq x \leq 0.5$, and y is a number satisfying $0<y \leq 0.1$, as described in Japanese Unexamined Patent Publication No. 58(1983)-206678, a phosphor represented by the formula $BaFX'xA{:}yEu^{2+}$ wherein X is at least one halogen selected from the group consisting of Cl, Br, and I, A is a calcination product of at least one compound selected from the hexafluoro compound group consisting of salts of hexafluoro silicic acid, hexafluoro titanic acid, and hexafluoro zirconic acid with monovalent or bivalent metals, x is a number satisfying $10^{-6} \leq x \leq 0.1$, and y is a number satisfying $0<y \leq 0.1$, as described in Japanese Unexamined Patent Publication No. 59(1984)-47289, a phosphor represented by the formula $BaFX{\cdot}xNaX'{:}aEu^{2+}$ wherein each of X and X' is at least one of Cl, Br, and I, x is a number satisfying $0<x \leq 2$, and a is a number satisfying $0<a \leq 0.2$, as described in Japanese Unexamined Patent Publication No. 59(1984)-56479, a phosphor represented by the formula $M^{11}FX{\cdot}xNaX'{:}yEu^{2+}{:}zA$ wherein $M^{II}$ is at least one alkaline earth metal selected from the group consisting of Ba, Sr, and Ca, each of X and X' is at least one halogen selected from the group consisting of Cl, Br, and I, A is at least one transition metal selected from the group consisting of V, Cr, Mn, Fe, Co, and Ni, x is a number satisfying $0<x \leq 2$, y is a number satisfying $0<y \leq 0.2$, and z is a number satisfying $0<z \leq 10^{-2}$, as described in Japanese Unexamined Patent Publication No. 59(1984)-56480, a phosphor represented by the formula $M^{II}FX{\cdot}aM^{I}X'{\cdot}bM'^{II}X''_2{\cdot}cM^{III}X'''_3{\cdot}xA{:}yEu^{2+}$ wherein $M^{II}$ is at least one alkaline earth metal selected from the group consisting of Ba, Sr, and Ca, $M^{I}$ is at least one alkali metal selected from the group consisting of Li, Na, K, Rb, and Cs, $M'^{II}$ is at least one bivalent metal selected from the group consisting of Be and Mg, $M^{III}$ is at least one trivalent metal selected from the group consisting of Al, Ga, In, and Tl, A is a metal oxide, X is at least one halogen selected from the group consisting of Cl, Br, and I, each of X', X", and X"' is at least one halogen selected from the group consisting of F, Cl, Br, and I, a is a number satisfying $0 \leq a \leq 2$, b is a number satisfying $0 \leq b \leq 10^{-2}$, c is a number satisfying $0 \leq c \leq 10^{-2}$, and $a+b+c \leq 10^{-6}$, x is a number satisfying $0<x \leq 0.5$, and y is a number satisfying $0<y \leq 0.2$, as described in Japanese Unexamined Patent Publication No. 59(1984)-75200, a stimulable phosphor represented by the formula $M^{II}X_2{\cdot}aM^{II}X'_2{:}xEu^{2+}$ wherein $M^{II}$ is at least one alkaline earth metal selected from the group consisting of Ba, Sr, and Ca, each of X and X' is at least one halogen selected from the group consisting of Cl, Br, and I, and $X \neq X'$, a is a number satisfying $0.1 \leq a \leq 10.0$, and x is a number satisfying $0<x \leq 0.2$, as described in Japanese Unexamined Patent Publication No. 60(1985)-84381, a stimulable phosphor represented by the formula $M^{II}FX{\cdot}aM^{I}X'{:}xEu^{2+}$ wherein $M^{II}$ is at least one alkaline earth metal selected from the group consisting of Ba, Sr, and Ca, $M^{I}$ is at least one alkali metal selected from the group consisting of Rb and Cs, X is at least one halogen selected from the group consisting of Cl, Br, and I, X' is at least one halogen selected from the group consisting of F, Cl, Br, and I, a is a number satisfying $0 \leq a \leq 4.0$, and x is a number satisfying $0<x \leq 0.2$, as described in Japanese Unexamined Patent Publication No. 60(1985)-101173, a stimulable phosphor represented by the formula $M^{I}X{:}xBi$ wherein $M^{I}$ is at least one alkali metal selected from the group consisting of Rb and Cs, X is at least one halogen selected from the group consisting of Cl, Br, and I, and x is a number falling within the range of $0<x \leq 0.2$, as described in Japanese Unexamined Patent Publication No. 62(1987)-25189, and a cerium activated rare earth element oxyhalide phosphor represented by the formula $LnOX{:}xCe$ wherein Ln is at least one of La, Y, Gd, and Lu, X is at least one of Cl, Br, and I, x is a number satisfying $0<x \leq 0.2$, the ratio of X to Ln, expressed in terms of the atomic ratio, falls within the range of $0.500<X/Ln \leq 0.998$, and a maximum wavelength $\lambda$ of the stimulation spectrum falls within the range of 550 nm$<\lambda<$700 nm.

The stimulable phosphor represented by the formula $M^{II}X_2{\cdot}aM^{II}X'_2{:}xEu^{2+}$, which is described in Japanese Unexamined Patent Publication No. 60 (1985)-84381, may contain the additives described below in the below-mentioned proportions per mol of $M^{II}X_2{\cdot}aM^{II}X'_2$:

$bM^{I}X''$ wherein $M^{I}$ is at least one alkali metal selected from the group consisting of Rb and Cs, X" is at least one halogen selected from the group consisting of F, Cl, Br, and I, and b is a number satisfying $0<b \leq 10.0$, as described in Japanese Unexamined Patent Publication No. 60(1985)-166379, $bKX''\cdot cMgX_2\cdot dM^{III}X'_3$ wherein $M^{III}$ is at least one trivalent metal selected from the group consisting of Sc, Y, La, Gd, and Lu, each of X", X, and X' is at least one halogen selected from the group consisting of F, Cl, Br, and I, b is a number satisfying $0\leqq b\leqq 2.0$, c is a number satisfying $0\leqq c\leqq 2.0$, d is a number satisfying $0\leqq d\leqq 2.0$, and $2\times10^{-5}\leqq b+c+d$, as described in Japanese Unexamined Patent Publication No. 60(1985)-221483, yB wherein y is a number satisfying $2\times10^{-4}\leqq y\leqq 2\times10^{-1}$, as described in Japanese Unexamined Patent Publication No. 60(1985)-228592, bA wherein A is at least one oxide selected from the group consisting of $SiO_2$ and $P_2O_5$, and b is a number satisfying $10^{-4}\leqq b\leqq 2\times10^{-1}$, as described in Japanese Unexamined Patent Publication No. 60(1985)-228593, bSiO wherein b is a number satisfying $0<b\leqq 3\times10^{-2}$, as described in Japanese Unexamined Patent Publication No. 61(1986)-120883, $bSnX''_2$ wherein X" is at least one halogen selected from the group consisting of F, Cl, Br, and I, and b is a number satisfying $0<b\leqq 10^{-3}$, as described in Japanese Unexamined Patent Publication No. 61(1986)-120885, $bCsX''\cdot cSnX_2$ wherein each of X" and X is at least one halogen selected from the group consisting of F, Cl, Br, and I, b is a number satisfying $0<b\leqq 10.0$, and c is a number satisfying $10^{-6}\leqq c\leqq 2\times10^{-2}$, as described in Japanese Unexamined Patent Publication No. 61(1986)-235486, and $bCsX''\cdot yLn^{3+}$ wherein X" is at least one halogen selected from the group consisting of F, Cl, Br, and I, Ln is at least one rare earth element selected from the group consisting of Sc, Y, Ce, Pr, Nd, Sm, Gd, Tb, Dy, Ho, Er, Tm, Yb, and Lu, b is a number satisfying $0<b\leqq 10.0$, and y is a number satisfying $10^{-6}\leqq y\leqq 1.8\times10^{-1}$, as described in Japanese Unexamined Patent Publication No. 61(1986)-235487.

Of the above-enumerated stimulable phosphors, the bivalent europium activated alkaline earth metal halide phosphor and the cerium activated rare earth element oxyhalide phosphor exhibit light emission with a high luminance and therefore are particularly preferable. However, the stimulable phosphor employed in the radiation image storage panels in accordance with the present invention is not limited to the phosphors enumerated above and may be one of various other phosphors, which have the properties such that, when the phosphors are caused to absorb radiation and are then exposed to stimulating rays, the phosphors emit light in proportion to the amount of energy stored thereon during exposure to the radiation.

The stimulable phosphor layer of the radiation image storage panel may comprise a binder and the stimulable phosphor dispersed in the binder. Alternatively, the stimulable phosphor layer of the radiation image storage panel may not contain the binder and may be constituted of only agglomerates of the stimulable phosphor. As another alternative, the stimulable phosphor layer of the radiation image storage panel may comprise the agglomerates of the stimulable phosphor and a high-molecular weight material contained in spaces between the agglomerates of the stimulable phosphor.

The radiation image storage panel in accordance with the present invention may be employed as the radiation image storage panel utilizing the stimulable phosphor. The radiation image storage panel in accordance with the present invention may also be employed as a panel, which utilizes a phosphor other than the stimulable phosphor and is utilized for converting radiation into visible light and/or ultraviolet radiation, e.g., an intensifying screen.

In cases where the radiation image storage panel in accordance with the present invention is utilized as the intensifying screen, the phosphors listed below may be employed appropriately:

a tungstate type of phosphor, such as $CaWO_4$, $MgWO_4$, or $CaWO_4$:Pb, a terbium activated rare earth element acid sulfide type of phosphor, such as $Y_2O_2S$:Tb, $Gd_2O_2S$:Tb, $La_2O_2S$:Tb, (Y, Gd) $_2O_2S$: Tb, or (Y, Gd) $O_2S$:Tb, Tm, a terbium activated rare earth element phosphate type of phosphor, such as $YPO_4$:Tb, $GdPO_4$:Tb, or $LaPO_4$:Tb, a terbium activated rare earth element oxyhalide type of phosphor, such as LaOBr:Tb, LaOBr:Tb, Tm, LaOCl:Tb, LaOCl:Tb, Tm, GdOBr:Tb, or GdOCl:Tb, a thulium activated rare earth element oxyhalide type of phosphor, such as LaOBr:Tm or LaOCl:Tm, a barium sulfate type of phosphor, such as $BaSO_4$:Pb, $BaSO_4:Eu^{2+}$, or $(Ba, Sr)SO_4:Eu^{2+}$, a bivalent europium activated alkaline earth metal phosphate type of phosphor, such as $Ba_3(PO_4)_2:Eu^{2+}$, a bivalent europium activated alkaline earth metal fluorohalide type of phosphor, such as $BaFCl:Eu^{2+}$, $BaFBr:Eu^{2+}$, $BaFCl:Eu^{2+}$,Tb, $BaFBr:Eu^{2+}$,Tb, $BaF_2\cdot BaCl_2\cdot KCl:Eu^{2+}$, or $(Ba, Mg)F_2\cdot BaCl_2\cdot KCl:Eu^{2+}$, an iodide type of phosphor, such as CsI:Na, CsI:Tl, NaI, or KI:Tl, a sulfide type of phosphor, such as ZnS:Ag, (Zn, Cd) S:Ag, (Zn, Cd)S:Cu, or (Zn, Cd)S:Cu, Al, a hafnium phosphate type of phosphor, such as $HfP_2O_7$:Cu, and a tantalate type of phosphor, such as $YTaO_4$, $YTaO_4$:Tm, $YTaO_4$:Nb, (Y, Sr)$TaO_{4-x}$:Nb, $LuTaO_4$, $LuTaO_4$:Nb, (Lu, Sr)$TaO_{4-x}$:Nb, $GdTaO_4$:Tm, or $Gd_2O_3\cdot Ta_2O_5\cdot B_2O_3$:Tb.

However, the phosphor employed in the radiation image storage panel in accordance with the present invention is not limited to the phosphors enumerated above and may be one of various other phosphors, which have the properties such that, when the phosphors are exposed to radiation, the phosphors emit light of the visible region or the near ultraviolet region.

How the radiation image storage panel is produced will be described hereinbelow. By way of example, how the radiation image storage panel, which has the phosphor layer comprising the binder and the stimulable phosphor dispersed in the binder, and which has the protective film overlaid on the surface of the phosphor layer, is produced will be described hereinbelow.

The phosphor layer may be formed on a substrate with a known technique described below. Specifically, the stimulable phosphor and the binder are added to a solvent and intimately mixed together. In this manner, a coating composition, in which the stimulable phosphor has been dispersed uniformly in the binder solution, is prepared. The mixing ratio of the binder to the stimulable phosphor in the coating composition varies for different characteristics desired for the radiation image storage panel, different kinds of the phosphors, and the like. Ordinarily, the mixing ratio of the binder to the stimulable phosphor is selected from the range between 1:1 and 1:100 (weight ratio). The mixing ratio of the binder to the phosphor should preferably be selected from the range between 1:8 and 1:40 (weight ratio).

The coating composition, which contains the stimulable phosphor and the binder and has been prepared in the manner described above, is uniformly applied onto a surface of a substrate. In this manner, a coating film is formed on the surface of the substrate. The operation for applying the coating composition onto the substrate may be performed by utilizing ordinary coating means, such as a doctor blade coater, a roll coater, or a knife coater.

The substrate may be constituted of a material selected from various kinds of materials known as substrates for conventional radiation image storage panels. In the conventional radiation image storage panels, such that the binding strength between the substrate and the stimulable phosphor layer may be enhanced, or such that the sensitivity of the radiation image storage panel may be enhanced or an image having good image quality (with respect to sharpness and graininess) may be obtained with the radiation image storage panel, a high-molecular weight substance, such as gelatin, is applied onto the surface of the substrate, on which surface the stimulable phosphor layer is to be overlaid, in order to form an adhesive properties imparting layer, or a light reflecting layer constituted of a light reflecting substance, such as titanium dioxide, a light absorbing layer constituted of a light absorbing substance, such as carbon black, or the like, is formed on the surface of the substrate, on which surface the stimulable phosphor layer is to be overlaid. In the process for producing a radiation image storage panel in accordance with the present invention, various such layers may be formed on the substrate. The layer constitution may be selected arbitrarily in accordance with the characteristics which the radiation image storage panel should have, and the like.

Also, as described in Japanese Unexamined Patent Publication No. 59(1984)-200200, such that an image having a high sharpness may be obtained, fine concavities and convexities may be formed on the surface of the substrate, on which surface the stimulable phosphor layer is to be overlaid. (In cases where the adhesive properties imparting layer, the light reflecting layer, the light absorbing layer, or the like, is formed on the surface of the substrate, on which surface the stimulable phosphor layer is to be overlaid, fine concavities and convexities may be formed on the surface of the layer formed on the substrate.)

After the coating film has been formed on the substrate, the coating film is dried, and the formation of the stimulable phosphor layer on the substrate is completed. Ordinarily, the layer thickness of the phosphor layer falls within the range of 20 $\mu$m to 1 mm, depending upon the characteristics required of the radiation image storage panel, the kind of the phosphor, the mixing ratio of the binder to the phosphor, and the like. The layer thickness of the phosphor layer should preferably fall within the range of 50 $\mu$m to 500 $\mu$m. The formation of the stimulable phosphor layer need not necessarily be performed by directly applying the coating composition onto the substrate in the manner described above. Alternatively, the phosphor layer may be formed by applying the coating composition onto a sheet, such as a glass plate, a metal plate, or a plastic material sheet, drying the applied coating composition, and the thus formed phosphor layer may then be adhered to the substrate by pushing the phosphor layer against the substrate or by using an adhesive agent. Thereafter, the protective film is overlaid on the phosphor layer with the laminating process described above, or the like.

Further, such that the sharpness of the obtained image may be enhanced, at least one of the layers constituting the radiation image storage panel in accordance with the present invention may be colored with a coloring agent, which absorbs the stimulating rays and does not absorb the light emitted by the stimulable phosphor. (The coloring is described in, for example, Japanese Patent Publication No. 59(1984)-23400.)

The present invention will further be illustrated by the following non-limitative examples.

EXAMPLE 1

Firstly, a phosphor sheet acting as a phosphor layer was prepared in the manner described below. A coating composition for forming a phosphor sheet was prepared in the manner described below. Specifically, 1,000 g of a phosphor (a phosphor represented by the formula $BaFBr_{0.8}I_{0.2}:Eu^{2+}$), 246 g of a 13% methyl ethyl ketone (MEK) solution of a polyurethane resin [Pandex T-5265H (solid), supplied by Dainippon Ink and Chemicals, Inc.], 30 g of a 50% MEK solution of a bisphenol A type epoxy resin [Epikote #1001 (solid), supplied by Yukashell Epoxy K. K.], 3 g of a polyisocyanate [Coronate HX (solid content: 100%), supplied by Nippon Polyurethane K. K.] acting as a crosslinking agent, 0.02 g of ultramarine blue (SM-1, supplied by Daiichi Kasei Kogyo K. K.) acting as a coloring agent, and 52 g of a MEK solution were subjected to dispersing processing, which was performed with a "disper" apparatus for three hours. In this manner, the coating composition having a viscosity of 3.5 Pa's (25° C.) was prepared. The thus prepared coating composition was applied with an extrusion coater onto a temporary substrate (a polyethylene terephthalate sheet having a thickness of 180 $\mu$m, on which a silicone type releasing agent had been applied). The applied coating composition was then dried and separated from the temporary substrate. In this manner, a phosphor sheet having a dry thickness of 250 $\mu$m was prepared.

Thereafter, a reflecting material layer was formed in the manner described below. Specifically, 350 g of fine particles of gadolinium oxide ($Gd_2O_3$) (in which the particle diameters of 90 wt % particles among all particles fell within the range of 1 gm to 5 $\mu$m), 1,800 g of a soft acrylic resin [Criscoat P-1018GS (20% toluene solution), supplied by Dainippon Ink and Chemicals, Inc.] acting as a binder, 40 g of a phthalic acid ester (#10, supplied by Daihachi Kagaku K. K.) acting as a plasticizer, 120 g of ZnO whisker (Panatetra A-1-1, supplied by Matsushita Amtec Co., Inc.) acting as a conductive agent, and 2 g of ultramarine blue (SM-1, supplied by Daiichi Kasei Kogyo K. K.) acting as a coloring agent were added to MEK. The resulting mixture was subjected to dispersing and dissolving processing, which was performed with a "disper" apparatus. In this manner, a dispersion for forming the reflecting material layer, which dispersion had a viscosity of 0.5 Pa's (20° C.), was prepared. The dispersion for forming the reflecting material layer was then uniformly applied onto a substrate [a polyethylene terephthalate sheet; Lumirror S-10, 250 $\mu$m, haze degree (typical):27, supplied by Toray Industries, Inc., provided with a light blocking layer (thickness: approximately 18 $\mu$m) on one side, the light blocking layer being constituted of carbon black, silica, and a binder]. At this time, the dispersion for forming the reflecting material layer was applied onto a surface of the substrate, which surface was opposite to the surface on the side of the light blocking layer, with an extrusion coater. The coating film of the dispersion was then dried. In this manner, the reflecting material layer having a thickness of 20 $\mu$m was formed.

Thereafter, the phosphor sheet and the substrate having been provided with the reflecting material layer were superposed one upon the other. Also, compression processing was performed continuously with a calender roll apparatus under the conditions of a pressure of 49 MPa, an upper roll temperature of 75° C., a lower roll temperature of 75° C., and a feed rate of 1.0 m/min. With the compression processing with heat, the phosphor sheet was perfectly fused as the phosphor layer (thickness: 210 μm) to the substrate via the reflecting material layer.

Thereafter, a protective layer was formed in the manner described below. Specifically, 40 g of a fluoroolefin-vinyl ether copolymer [Lumiflon LF-504X (30% xylene solution) supplied by Asahi Glass Co., Ltd.] acting as a fluorine type copolymer resin solution, 28.4 g of a melamine-formaldehyde (Eposter S6, supplied by Nippon Shokubai Kagaku Kogyo Co., Ltd.) acting as an organic filler, and 0.5 g of an acetalkoxy aluminum di-isopropylate (Plenact AL-M, supplied by Ajinomoto Co., Inc.) acting as a dispersing agent were added to 200 g of MEK and mixed together. The resulting mixture was then subjected to dispersing processing for 20 hours, which was performed with a ball mill utilizing 3 mm-dia. zirconia balls. Thereafter, 360 g of Lumiflon LF-504X (30% xylene solution) was added to the mixture, and the dispersing processing was further continued for four hours to prepare a dispersion. Thereafter, 7.1 g of a silicone macro-monomer (FM-0425), 44.4 g of a polyisocyanate [Sumidur N3300 (solid content: 100%) supplied by Sumitomo Bayer Urethane K. K.] acting as a crosslinking agent, and 2.8 mg of dibutyltin dilaurate (KS1260, supplied by Kyodo Yakuhin K. K.) acting as a catalyst were added to and mixed with 800 g of MEK, and the resulting mixture was added to and mixed with the dispersion, which had been prepared in the manner described above. In this manner, a coating composition was prepared.

With a bar coater, the thus prepared coating composition was then applied onto a 9 μm-thick PET film (Lumirror 9-F53, supplied by Toray Industries, Inc.), which had previously been adhered to a heat-resistant peelable film. The applied coating composition was subjected to heat treatment at 120° C. for 20 minutes and was thereby thermally cured and dried. In this manner, a coating layer having a thickness of 2 μm was formed. Thereafter, the heat-resistant peelable film was separated from the 9 μm-thick PET film having been provided with the coating layer. Also, a solution containing a polyester resin (Vylon 30SS, supplied by Toyobo Co., Ltd.) was applied onto the surface of the 9 μm-thick PET film, which surface was opposite to the surface provided with the coating layer. The applied solution was dried to form an adhesive layer (adhesive agent application rate: 2 $g/m^2$). The PET film was then adhered to the phosphor layer via the adhesive layer by using laminating rolls, and a protective layer was thereby formed on the phosphor layer. Further, an emboss (surface roughness Ra, expressed in terms of arithmetic mean deviation: 0.4 μm) was formed on the protective layer by utilizing an embossing machine.

Thereafter, a solution containing an unsaturated polyester resin (Vylon 30SS, supplied by Toyobo Co., Ltd.) was applied onto a 20 μm-thick OPP film (Torayfine YM-11#20, supplied by Toray Industries, Inc.) and dried to form an adhesive layer (adhesive agent application rate: 9 $g/m^2$). The OPP film was then adhered to a surface of the substrate, which surface was opposite to the surface provided with the phosphor layer (i.e., which surface was on the side of the light blocking layer), via the adhesive layer by using laminating rolls, and a back protective layer was thereby formed on the substrate.

Finally, 70 g of a polyurethane having a polydimethylsiloxane unit [Daiallomer SP-3023 (15% MEK/toluene solution), supplied by Dainichi Seika K. K.] acting as a silicone type of polymer, 3 g of a polyisocyanate [Crossnate D-70 (50% solution), supplied by Dainichi Seika K. K.] acting as a crosslinking agent, 0.6 g of an epoxy resin [Epikote#1001 (solid), supplied by Yuka Shell Epoxy K. K.] acting as an anti-yellowing agent, and 0.2 g of an alcohol-modified silicone [X-22-2809 (66% xylene-containing paste), supplied by Shin-Etsu Chemical Co., Ltd.] acting as a lubricant were dissolved in 15 g of MEK, and a coating composition for forming side face layers was thereby prepared. The thus prepared coating composition was then applied onto side faces of the phosphor sheet provided with the protective layer, which phosphor sheet had been formed in the manner described above. In the manner described above, a radiation image storage panel, which was provided with the protective layers and whose upper surface and side faces had been protected, was produced.

EXAMPLE 2

A radiation image storage panel was produced in the same manner as that in Example 1, except that, in lieu of the silicone macro-monomer (FM-0425) utilized in the protective layer, the same amount of FM-4425 was utilized.

EXAMPLE 3

A radiation image storage panel was produced in the same manner as that in Example 1, except that, in lieu of the silicone macro-monomer (FM-0425) utilized in the protective layer, the same amount of FM-3325 was utilized.

EXAMPLE 4

A radiation image storage panel was produced in the same manner as that in Example 1, except that, in lieu of the silicone macro-monomer (FM-0425) utilized in the protective layer, the same amount of FM-DA25 was utilized.

EXAMPLE 5

A radiation image storage panel was produced in the same manner as that in Example 1, except that, in lieu of the silicone macro-monomer (FM-0425) utilized in the protective layer, the same amount of FM-DA26 was utilized.

EXAMPLE 6

A radiation image storage panel was produced in the same manner as that in Example 1, except that, in lieu of the silicone macro-monomer (FM-0425) utilized in the protective layer, 1.4 g of the silicone macro-monomer (FM-DA26) was utilized.

EXAMPLE 7

A radiation image storage panel was produced in the same manner as that in Example 1, except that, in lieu of the silicone macro-monomer (FM-0425) utilized in the protective layer, 14.2 g of the silicone macro-monomer (FM-DA26) was utilized.

EXAMPLE 8

A radiation image storage panel was produced in the same manner as that in Example 1, except that 22.2 g of an amino resin (Cymel 303 supplied by Mitsui Cytec Ltd.) acting as a crosslinking agent was utilized in lieu of the polyisocyanate acting as the crosslinking agent in the protective layer, 0.7 g of a catalyst (CAT600 supplied by Mitsui Cytec Ltd.) was utilized in lieu of the dibutyltin dilaurate catalyst in the protective layer, and 1.4 g of FM-DA26 was utilized as the silicone macro-monomer in the protective layer.

EXAMPLE 9

A radiation image storage panel was produced in the same manner as that in Example 1, except for the procedures described below. Specifically, a coating composition for forming a protective layer was prepared by mixing 300 g of Lumiflon LF-504X (30% xylene solution), 1.6 g of a silicone macro-monomer (FM-DA26), 52.4 g of an isocyanate [Olester NP-38-70S (70% ethyl acetate solution) supplied by Dainippon Ink and Chemicals, Inc.] acting as a crosslinking agent, 1.6 mg of dibutyltin dilaurate (KS1260, supplied by Kyodo Yakuhin K. K.) acting as a catalyst, 147 g of MEK, and 520 g of cyclohexane by use of a "disper" apparatus. The thus prepared coating composition for forming a protective layer was applied onto a phosphor layer, which had been formed with the calendering process in the same manner as that in Example 1, by use of a slide coater such that the dry thickness became equal to 2 μm. The applied coating composition was then dried and cured at a temperature of 120° C. In this manner, a protective layer having a thickness of 2 μm was directly formed on the phosphor layer.

COMPARATIVE EXAMPLE 1

A radiation image storage panel was produced in the same manner as that in Example 1, except that, in lieu of the silicone macro-monomer, a wax-like alcohol-modified silicone (X22-2809, 66% xylene solution, supplied by Shin-Etsu Chemical Co., Ltd.) described in Japanese Patent No. 2715189 was utilized in an amount corresponding to a solid content of 1.4 g.

COMPARATIVE EXAMPLE 2

A radiation image storage panel was produced in the same manner as that in Example 1, except that, in lieu of the silicone macro-monomer, the wax-like alcohol-modified silicone (X22-2809, 66% xylene solution, supplied by Shin-Etsu Chemical Co., Ltd.) described in Japanese Patent No. 2715189 was utilized in an amount corresponding to a solid content of 10.8 g.

COMPARATIVE EXAMPLE 3

A radiation image storage panel was produced in the same manner as that in Example 8, except that, in lieu of the silicone macro-monomer, the wax-like alcohol-modified silicone (X22-2809, 66% xylene solution, supplied by Shin-Etsu Chemical Co., Ltd.) described in Japanese Patent No. 2715189 was utilized in the same amount, expressed in terms of the solid content.

COMPARATIVE EXAMPLE 4

A radiation image storage panel was produced in the same manner as that in Example 9, except that, in lieu of the silicone macro-monomer, the wax-like alcohol-modified silicone (X22-2809, 66% xylene solution, supplied by Shin-Etsu Chemical Co., Ltd.) described in Japanese Patent No. 2715189 was utilized in the same amount, expressed in terms of the solid content.

COMPARATIVE EXAMPLE 5

A radiation image storage panel was produced in the same manner as that in Example 1, except that the silicone macro-monomer was not utilized in the protective layer. Evaluation of radiation image storage panel:

1. Coefficient of friction

As for each of the radiation image storage panels produced in Examples 1 to 9 and Comparative Examples 1 to 5, the coefficient of friction of the surface of the protective film was measured with the technique described below.

Specifically, the radiation image storage panel was cut into rectangular pieces having a size of 5 cm×15 cm. Each of the cut pieces was then located on a measurement table, which could be inclined, such that the protective film stood facing up. Thereafter, a weight of 0.98N was applied to an EPDM rubber sheet having been cut to a size of 3 cm×4 cm, and the EPDM rubber sheet was placed on the protective film. The measurement table was than inclined little by little, and an angle δ, at which the nonwoven sheet begun moving, was measured. A coefficient of static friction (μ value) was calculated from the angle δ and with the formula shown below.

$$\mu \text{ Value}=\tan \delta$$

Evaluation was made before the sliding operations described later were performed and after the sliding operations described later were performed.

2. Magic ink anti-staining properties

A line was drawn on the surface of the protective film and with a black Magic ink. After the Magic ink line dried, the Magic ink line was dry-wiped with Kymwipe, and the degree of erasing of the Magic ink line was observed. The Magic ink anti-staining properties were rated as shown below.

○:No line remained.
Δ: Approximately one-half of the line remained.
X: The line could not be erased.

3. Magic ink anti-staining properties after sliding operations

The radiation image storage panel was cut into rectangular pieces having a size of 5 cm×15 cm. A weight of 0.98N was applied to an EPDM rubber sheet having been cut to a size of 3 cm×4 cm, and the EPDM rubber sheet was reciprocally slid 200,000 times on the protective film of each of the cut pieces of the radiation images to rage panel. After the sliding operations were performed, a line was drawn on the surface of the protective film and with a black Magic ink. After the Magic ink line dried, the Magic ink line was dry-wiped with Kymwipe, and the degree of erasing of the Magic ink line was observed. The Magic ink anti-staining properties after sliding operations were rated as shown below.

◎: The line could be wiped off easily, and no line remained.
○: No line remained.
Δ: Approximately one-half of the line remained.
X: The line could not be erased.

4. Anti-scratching properties

The anti-scratching properties of the surface of the protective film after the sliding operations were rated as shown below.

○: No scratch occurred.
Δ: Scratches occurred slightly, but no problem occurred in practical use.
X: Very many scratches occurred.

The results shown in Table 1 below were obtained. In Table 1, the rating expressed as "ΔX" represents the rating intermediate between "Δ" and "X."

TABLE 1

| Example | Reactive Silicone Kind | Reactive Silicone Amount (g) | Coefficient of Friction Before Sliding Operations | Coefficient of Friction After Sliding Operations | Magic ink anti-staining properties Before Sliding Operations | Magic ink anti-staining properties After Sliding Operations | Anti-scratching Properties |
|---|---|---|---|---|---|---|---|
| Ex. 1 | FM-0425 | 7.1 | 0.26 | 0.36 | ○ | ○ | ○ |
| Ex. 2 | FM-4425 | 7.1 | 0.22 | 0.35 | ○ | ○ | ○ |
| Ex. 3 | FM-3325 | 7.1 | 0.22 | 0.34 | ○ | ○ | ○ |
| Ex. 4 | FM-DA25 | 7.1 | 0.22 | 0.30 | ◎ | ○ | ○ |
| Ex. 5 | FM-DA26 | 7.1 | 0.21 | 0.28 | ◎ | ◎ | ○ |
| Ex. 6 | FM-DA26 | 1.4 | 0.21 | 0.28 | ◎ | ○ | ○ |
| Ex. 7 | FM-DA26 | 14.2 | 0.20 | 0.27 | ◎ | ◎ | ○ |
| Ex. 8 | FM-DA26 | 7.1 | 0.25 | 0.36 | ◎ | ◎ | ○ |
| Ex. 9 | FM-DA26 | 1.6 | 0.23 | 0.31 | ◎ | ○ | ○ |
| Comp. Ex. 1 | X22-2809 | 1.4 | 0.17 | 0.49 | ○ | X | Δ |
| Comp. Ex. 2 | X22-2809 | 10.8 | 0.14 | 0.53 | ○ | X | ΔX |
| Comp. Ex. 3 | X22-2809 | 2.1 | 0.30 | 0.62 | ○ | ΔX | Δ |
| Comp. Ex. 4 | X22-2809 | 2.4 | 0.20 | 0.55 | ○ | X | X |
| Comp. Ex. 5 | None | 0 | 0.64 | 1.13 | X | X | X |

As clear from the results shown in Table 1, even after 200,000 times of sliding operations, the radiation image storage panel in accordance with the present invention exhibits a low coefficient of friction of the surface of the protective film, excellent anti-staining properties, and excellent anti-scratching properties. It has thus been found that the radiation image storage panel in accordance with the present invention is capable of coping with an increased number of times of repeated use recently required of radiation image storage panels.

What is claimed is:

1. A radiation image storage panel, comprising at least a phosphor layer and a protective film, wherein the protective film contains a film-forming resin, a reactive silicone, which has at only one terminal at least two hydroxyl groups or at least two amino groups, has no reactive groups at the other terminal, and has a number-average molecular weight falling with the range of 5,000 to 30,000, and a crosslinking agent, and wherein the reactive silicon is crosslinked with the crosslinking agent.

2. A radiation image storage panel as defined in claim 1 wherein the film-forming resin contains a fluorine resin, which is soluble in an organic solvent.

3. A radiation image storage panel as defined in claim 1 or 2 wherein the number-average molecular weight of the reactive silicone falls within the range of 10,000 to 20,000.

4. A radiation image storage panel as defined in claim 1 or 2 wherein the reactive silicone is contained in a proportion falling within the range of 0.1% by weight to 20% by weight with respect to the film-forming resin.

5. A radiation image storage panel as defined in claim 1 or 2 wherein the number of equivalents of crosslinking agent is greater than or equal to the total number of equivalents of the film-forming resin and the reactive silicone.

6. A radiation image storage panel as defined in claim 1 or 2 wherein the crosslinking agent is selected from the group consisting of a polyisocyanate and an amino resin.

7. A radiation image storage panel as defined in claim 6 wherein the polyisocyanate is a non-yellowing polyisocyanate.

* * * * *